United States Patent

[11] 3,620,865

[72] Inventor Harvey J. Golumbic
 1517 Sunrise Ln., Fullerton, Calif. 92633
[21] Appl. No. 808,762
[22] Filed Mar. 20, 1969
[45] Patented Nov. 16, 1971
[73] Assignees Harvey J. Golumbic;
 Robert M. Bregoff; Alfred A. Calabro,,
 part interest to each

[54] METHOD FOR REPAIRING FLEXIBLE MATERIALS
 7 Claims, 3 Drawing Figs.
[52] U.S. Cl. .................................................. 156/98
[51] Int. Cl. ............................................... B32b 35/00
[50] Field of Search........................................ 156/98, 94,
 222

[56] References Cited
 UNITED STATES PATENTS
 2,855,338 10/1958 Molkey .................... 156/94
 3,271,217 9/1966 Mapson ..................... 156/98

Primary Examiner—Benjamin A. Borchelt
Assistant Examiner—Daniel Bent
Attorney—Christie, Parker & Hale ABSTRACT: Damaged, flexible vinyl materials, such as automobile seats and tops, are repaired by a welding compound which is grained and colored to match the base material. The damaged section of the base material is prepared by removing frayed edges and the like to obtain a clean, sharp periphery. The base material is cleaned by a solvent to ensure adhesion or fusion of the welding compound with it. The welding compound is a vinyl compound which has a relatively high tensile strength and relatively low fusion point. This compound is applied in layers to the cutout area of the base material, with each layer being cured after it is applied. The final layer is smoothened to present a continuous, uninterrupted surface from the base material across the weld compound material. A graining tool, which is both hard and flexible, is obtained from an impression of the base material or material having the same grain structure. The graining tool is applied to the upper surface of the cured welding compound after it and the surrounding base material have been heated sufficiently to receive the grain impression.

PATENTED NOV 16 1971        3,620,865

INVENTOR.
HARVEY J. GOLUMBIC

BY

Christie, Parker & Hale
ATTORNEYS

METHOD FOR REPAIRING FLEXIBLE MATERIALS

BACKGROUND OF THE INVENTION

The present invention relates to a process for repairing flexible articles and, more in particular, to a process for repairing vinyl base material such as automotive upholstery and vinyl tops.

Vinyl materials have become extremely popular for use in automobiles, home furnishings and the like. The surface of vinyl materials can be textured to simulate almost any pattern desired. An example of this is simulated leather upholstery of vinyl.

As in most materials, vinyl materials can become damaged. Damage to the material by cigarette burns, knife cuts, tears, splits and the like is not uncommon.

Heretofore, there has been no effective way of repairing damage to vinyl base materials because the repair did not mirror the qualities of the base material. Thus, a repair might be hard, but vinyl material is flexible; or the repair might be smooth, while the vinyl base material is grained. Oftentimes the repair, upon aging or curing, lost its adhesion to the base material, whereupon the repair became useless.

For the lack of an effective means of repairing damaged vinyl articles esthetically, their owners were confronted with expensive reupholstering or living with damaged articles.

Therefore, there is a need for an effective and cheap method for repairing vinyl articles which produces a repair of substantially the same quality as the undamaged base material.

SUMMARY OF THE INVENTION

The present invention envisions the use of a flexible, high strength and relatively low fusion point welding compound of a vinyl base material applied in layers in a prepared area of a damaged vinyl article which, after curing, is grained and colored if desired.

In more specific form, the method of the present invention includes applying layers of a welding compound in a prepared hole in the vinyl base material to be repaired. An initial layer is applied over backing material, for example, the roof of an automobile in the case of a repair to a vinyl top, or sponge rubber in he case of a repair to an automobile seat. This layer is cured by heat and allowed to cool. An intermediate layer, or layers, is applied in identical fashion to the first layer, and finally, a final layer is applied. Before curing the final layer, it is smoothened or leveled to present a repair which is continuous with the surface of the vinyl base material being repaired. After leveling, the last layer is cured by heat.

When a grain texture is to be applied to the welding compound, a graining tool having a die face with the required grain pattern is applied to the upper layer of the welding compound after it is heated and after it is cured. The upper layer is heated to soften the surface of the layer and adjacent vinyl material surrounding the layer for reception of the impression of the die. The die is applied to this heated area under pressure. The die is sufficiently large in area to feather the surface of the base material proximate the repair. The resultant surface is cooled before removal of the graining tool, as by cooling the graining tool with a wet cloth or sponge.

If desired, the repaired area of the vinyl base material may be color-sprayed with a vinyl color spray.

The process of the present invention provides an expedient and cheap way of repairing flexible vinyl materials which have been damaged as by ripping, tearing, burns or the like. The process produces a repair which is essentially identical in appearance to the vinyl base material being repaired.

These and other features, aspects and advantages of the present invention will become more apparent from the following description, appended claims and drawings.

DESCRIPTION OF THE PREFERRED EMBODIMENTS

Figure 1:
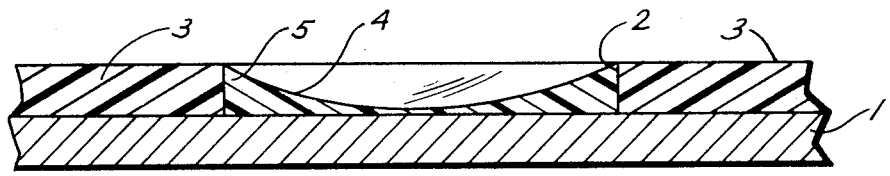
FIG. 1 is a depiction of an initial layer of weld compound applied in a repaired hole of a flexible vinyl material such as a vinyl top of an automobile roof.

The process of the present invention contemplates the preparation of a damaged area in a vinyl base material by removing loose, damaged and frayed vinyl base material. This can be done with a sharp instrument such as a knife or razor blade. The object is to get a clean and sharp edge bounded on one side by the area to be repaired and on the other with undamaged vinyl. In the event that the repair is to a razor-type cut, the cut or slit is opened by cutting a little base material away to develop a wider slit, for example, about a one-sixteenth of an inch. This provides room for the vinyl welding compound, hereinafter described, and ensures a strong fusion bond between the welding compound and the base material being repaired.

Further preparation of the joint may be required where the vinyl material is glued to a substrate such as a car roof. Glue adversely affects the curing of the vinyl-welding material and therefore must not be in the area where such material is applied. The effect of the glue on the vinyl-welding compound is that the compound will crack. Therefore, any regluing which must be done to the vinyl base material should be done without allowing glue to get onto the substrate over which the vinyl-welding material is to be applied and to present clean edges for the vinyl-welding material to fuse with.

In order to obtain satisfactory fusion between the vinyl-welding compound and the base material being repaired, it is necessary that the vinyl base material defining the repair hole or slit be thoroughly cleaned. This may be done with any good quality solvent such as toluol which will remove grease and the like to present a clean vinyl surface without leaving a residue. In addition to grease removal, it is preferred that a mild vinyl solvent be used to clean a small film of vinyl off the area of the base material bounding the repair hole to be sure that all foreign matter is removed. The removal of foreign matter from the surface of the vinyl base material bounding the hole is necessary if edge lifting is to be avoided.

After the area of the surface of the vinyl material to be repaired has been thoroughly cleaned, it must dry. Drying may be done by wiping the solvent cleaners away and by the application of heat as from a commercially available heat gun. X The vinyl-welding compound used in repairing a damaged vinyl article is a vinyl compound having a high tensile strength relative to the vinyl base material but with a fusion point compatible with the base material. The requirement of a low fusion point is necessary to prevent damage to the base material during the curing of the welding compound. The following table shows satisfactory ingredients for a welding compound. The amounts shown are for a 90-gallon batch.

TABLE I

|  | | Parts by Weight |
|---|---|---|
| Diamond PVC 7401 | 360 lbs. | 0.445 |
| Diamond PVC 71 | 120 lbs. | 0.150 |
| Diisodecyl Phalate (DIDP) | 320 lbs. | 0.395 |
| Ferro 1777 | 3,600 g. | 0.010 |

Diamond PVC 7401 has a low fusion temperature and relatively low tensile strength. The addition of Diamond PVC 71 to PVC 7401 increases tensile strength but also increases the fusion temperature. Diamond PVC 7401 is a copolymer of vinyl chloride and polyvinyl acetate manufactured by the dispersion method. Diamond PVC 71 is a homopolymer of polyvinyl chloride manufactured by the dispersion method which has a fusion temperature of from between about 325° to 350° F. The balance shown in he table has proven highly satisfactory in accommodating both the requisites of tensile strength and fusion temperature. The diisodecyl phalate is used to increase the flexibility of the welding compound. If too much of this plasticizer is used, the welding compound loses desirable tensile strength. The ferro 1777 is a stabilizer. It is a calcium-zinc organic inhibitor. The composition set forth above is a thermoplastic and thermosetting material which must be cured. It has been found that if this composition is too thick, effective curing is impossible without damaging the vinyl base material. This is so because the amount of heat required to cure the welding compound, when the latter is thick, damages the vinyl base material surrounding the welding compound. Stated alternatively, with the low heat flux required to prevent damage to the vinyl base material, only the surface of a thick layer of weld compound would be cured.

As a consequence, the process of the present invention contemplates that the weld compound be layered into the hole in the vinyl base material and cured after each layer has been applied. Generally speaking, with most vinyl base material thicknesses, four layers are satisfactory. The first layer must, of course, be backed in order to prevent the compound from sagging through the hole. Normally the backing is provided by seat cushion material or, in the case of vinyl tops, the steel automobile roof. If it is not, then some form of backing must be used. Thus, when the sponge rubber used in many automobile upholstery applications is split in the area to be fixed, the sponge rubber split is filled with, for example, cotton.

Another consideration should be observed if grain flattening of the vinyl base material is to be avoided in situations where the substrate absorbs considerable amounts of the heat applied during curing. This situation occurs, for example, in vinyl top repairs where the steel substrate absorbs and retains curing heat applied with a heat gun during sectioning. This applied heat causes the grain of the base material to flatten. To prevent this, an insulating layer of, say cardboard, should be placed between the metal and welding compound.

Each layer of welding material may be applied to the cutout hole as shown schematically in the Figures. The Figures illustrate a substrate or backing 1, for example a car roof, a prepared hole 2, and a vinyl base material 3 overlying the substrate and bounding hole 2. An initial layer 4 is laid over substrate 1 with, for example, a pallet knife. This initial layer should be worked around the lower edges of the vinyl base material surrounding the repaired hole. A fillet 5 is developed between the wall of hole 2 and the balance of the first layer. Care should be taken to remove all excess welding compound material from the upper or top surface of the vinyl base material before the cure of the initial layer to prevent roughness on the vinyl base material surrounding the repair. The initial layer is cured as by a heat gun. This layer must be cured properly if the resulting weld is to be effective. With the welding compound specifically discussed above, the cure is effected when the weld material becomes clear. This initial layer is fused with the vinyl base material and, therefore, the demarcation shown is not actually present.

Figure 2:
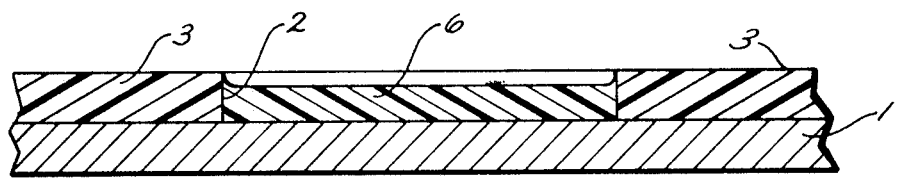
FIG. 2 is a view similar to FIG. 1 showing the repair after intermediate layers of welding compound have been applied.
Figure 3:
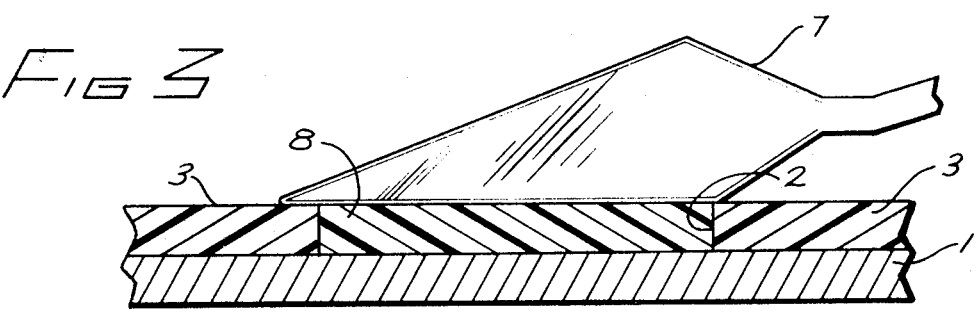
FIG. 3 is a view showing the finishing of a repair.

After curing, the layer is allowed to cool for the application of the intermediate layers. This may be done by cold water on a wet cloth. The intermediate layers are applied exactly as the initial layer. Thus the layers are worked around the edges of the vinyl material defining the hole and are applied thinly in order to have an effective cure. The resulting repair at this stage is shown in FIG. 2 with the layered and cured welding compound indicated by reference numeral 6.

The final layer is applied just as the initial and intermediate layers are, but is smoothened or leveled flush with the upper surface of the vinyl base material before curing. After it is leveled, as by a pallet knife 7, the upper surface is cured, again by the application of heat. The leveled or smoothened repair is indicated by reference numeral 8. Again, it should be emphasized, the repair after curing is fused with the vinyl base material and therefore the illustrated distinctive boundary between the two is not in fact present.

Generally, the grain or surface texture of the vinyl base material must be duplicated in the exposed surface of the cured welding compound. This is done by a graining tool which is applied to a heated and softened surface of the cured weld compound and adjacent vinyl base material.

The graining tool is made with a relatively hard but yet flexible material which has a die surface with the impression of the grain pattern or surface texture desired. The graining tool may be fabricated from the ingredients and in the proportions listed below in table II.

TABLE II

| Reichold polyester resin 32–345 | 450 lbs. |
| Reichold polyester resin 31–851 | 50 lbs. |
| Calcium carbonate | 400 lbs. |
| Talc | 100 lbs. |

The polyester resin 32–345 has a very good curing rate and is dry to the touch after it cures, due to the presence of metallic drying agents. It is resilient but not flexible, that is, it is stiff. The polyester resin 31–851 is added to enhance flexibility and therefore reduces the stiffness which would result from the exclusive use of the polyester resin 32–345. These polyesters do not adhere to the vinyl material of the repair and base material. Both resins are a semisaturated polymer where some of the saturated adipic acids have been replaced with some phthalic anhydrides and some of the propylene glycols have been replaced by the more flexible diethylene glycol. Both resins also have a styrene monomer which forms a polyester monomer with an acid value of from between 20 to 25. Resin 31–851 has more diethylene glycol than resin 32–345 to add flexibility.

The calcium carbonate is an extender to reduce the cost of the compound used in fabricating the grain-on tools. The talc has absorption qualities that are used for the purpose of adjusting viscosity.

A mold release of, say, silicone is placed over the vinyl base material. The grain-on compound just described is poured on a flat, nonporous surface and mixed with an activator. The activated grain-on compound is then removed from the surface and applied over the area of the vinyl base material which has been coated with the silicone mold release. The activated grain-on compound is then leveled as by a spatula or stick.

Preferably, a backing of a second piece of vinyl having the grain or surface texture of the piece being repaired is placed on the grain-on compound before it sets up. The canvas or fabric side of this backing vinyl piece contacts the grain-on compound in order to show the grain texture. Pressure is applied to the grain-on compound and backing strip while they are still on the vinyl base material, as by a board or small weight. After a period of time, the grain-on compound will set and harden. It may then be peeled off the vinyl base material. The resulting grain-on tool has a die face with the impression of the grain or surface texture of the vinyl base material.

The grain-on tool may be registered or indexed with a repetitive pattern of the vinyl base material. This is done by aligning the backing vinyl piece with an identical pattern on the base material before the grain-on compound has set. The backing vinyl piece can then be indexed with the area of the vinyl base material surrounding the repair.

A grain is applied by the graining tool by softening the surface of the upper layer of weld compound and the adjacent surface of the vinyl base material and then applying the grain-on tool over the upper surface and adjacent surface of the vinyl base material under pressure. After a small period of time, for example, 5 seconds, and after cooling the grain-on tool as by a wet cloth or sponge, the tool is removed. Color may be applied to the repaired area through a vinyl color spray.

What is claimed is:

1. A process for repairing a damaged area in a vinyl base material comprising:
   a. preparing an area to be repaired by removing damaged vinyl base material to obtain a sharp edge in the vinyl base material which defines an open hole;
   b. cleaning the surface of the base material adjacent the hole;
   c. drying the cleaned area;
   d. applying successive thin layers of a liquid thermoplastic and thermosetting vinyl-welding compound having a fusion temperature compatible with that of the vinyl base material and a high tensile strength relative to the vinyl base material into the hole;
   e. working each layer around the edge of the hole to obtain intimate contact between the vinyl base material and the layers; X
   f. curing each layer by the application of heat after each layer has been worked;
   g. cooling each cured layer before applying a successive layer to prevent the immediate curing of the successive layer; and
   h. smoothening the last layer before it is cured to obtain a continuous surface between the vinyl base material and such last layer.

2. The process claimed in claim 1 including the additional step of graining the surface of the cured last layer by:
   a. heating the surface of the cured last layer to soften it;
   b. applying a graining tool having the grain pattern of the vinyl base material in a die face thereof to the softened surface with the die face on such softened surface;
   c. maintaining the graining tool on the softened surface under a slight pressure to obtain a grain therein; and
   d. cooling the graining tool while maintaining the slight pressure to allow the grained softened surface to harden.

3. The process claimed in claim 1 including the additional step of graining the area defined by the cured last layer and the adjacent surface of the vinyl base material by:
   a. heating the so defined area to soften it;
   b. applying a graining tool having the grain pattern of the vinyl base material in a die face thereof to the softened area with the die face on such softened area;
   c. maintaining the graining tool on the softened area under a slight pressure to obtain a grain pattern therein which is feathered with the grain of the vinyl base material; and
   d. cooling the graining tool while maintaining the slight pressure to allow the grained softened area to harden.

4. The process claimed in claim 1 wherein the thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phalate, and minor amounts of a stabilizer.

5. The process claimed in claim 3 wherein the thermoplastic welding compound comprises, in parts by weight, about 0.445 parts of a copolymer of vinyl chloride and polyvinyl acetate, about 0.150 parts of a homopolymer of polyvinyl chloride having a fusion temperature of from between about 325° to 350° F., about 0.395 parts diisodecyl phalate, and minor amounts of a stabilizer.

6. The process claimed in claim 3 wherein the graining tool has a backing with the grain pattern of the vinyl base material, the die face grain pattern is in register with the grain pattern on the backing, and the graining tool is applied to the softened area with the grain pattern on the backing in index with the grain pattern of the vinyl base material.

7. The process claimed in claim 3 wherein the graining tool has a backing with the grain pattern of the vinyl base material.

* * * * *